Aug. 2, 1960

H. H. DEIST 2,947,531

CONTROL DEVICE FOR VEHICLE SUSPENSION SYSTEM

Filed April 4, 1956

INVENTOR.
HERBERT H. DEIST
BY
W. A. Fraser
ATTY.

INVENTOR.
HERBERT H·DEIST
BY
W. A. Fraser
ATTY·

United States Patent Office 2,947,531
Patented Aug. 2, 1960

2,947,531

CONTROL DEVICE FOR VEHICLE SUSPENSION SYSTEM

Herbert H. Deist, Akron, Ohio, assignor to The Firestone Tire & Rubber Company, Akron, Ohio, a corporation of Ohio Filed Apr. 4, 1956, Ser. No. 576,047

1 Claim. (Cl. 267—65)

This invention relates generally to suspension systems for vehicles. More particularly, the invention relates to pneumatic suspension systems and provides means whereby pneumatic devices, such as bellows type air springs, may be inflated or exhausted and thus be made suitable for increased or decreased vehicle loads causing a substantial change in the riding level of the vehicle.

Pneumatic suspension systems, incorporating air springs interposed between the vehicle frame and road or running gear, have been slow to achieve commercial success because they have not been provided with satisfactory valve means for controlling and regulating the air cushion within the air springs. Maintaining a constant average air spring length or air cushion under variable static load conditions, will provide a constant riding level for the vehicle.

A satisfactory valve means for effectively controlling the riding level of a vehicle having an air spring suspension, must be responsive to changing static load conditions. An increase in the load will compress the air spring. To restore the air spring to its initial position, air under increased pressure must be admitted into the air spring. A decrease in load will cause the air spring to extend or raise, and therefore, air must be exhausted or vented from within the air spring to restore it to its initial position.

The operation of the valve means also must not be influenced by the natural frequency of the vehicle suspension system.

Lastly, a satisfactory valve and its control means must be unaffected by and remain operative under extremes of temperature, humidity and exposure to sand, dirt, grease, oil and water.

It is therefore an object of this invention to provide an improved pneumatic suspension system for vehicles, which system includes improved valve and valve control means operative only when the vehicle is not in motion, for controlling and regulating air springs interposed between the vehicle frame and road gear, so as to furnish a constant riding level for the vehicles and a constant average air spring length under varying static load conditions.

Another object is to provide an improved valve and control means for control and regulation of a vehicle air spring suspension which controls the supply and exhaust of air to the air spring and is operative when the vehicle is not in motion even under extremes of temperature, humidity and other environmental conditions.

A further object is to provide an improved valve and control means located remotely of the air springs and embodying therein a novel means to prevent operation of the valve and control means when the vehicle is in motion.

These and other objects will be apparent in view of the following detailed description of the invention considered with the attached drawings.

Figure 1:
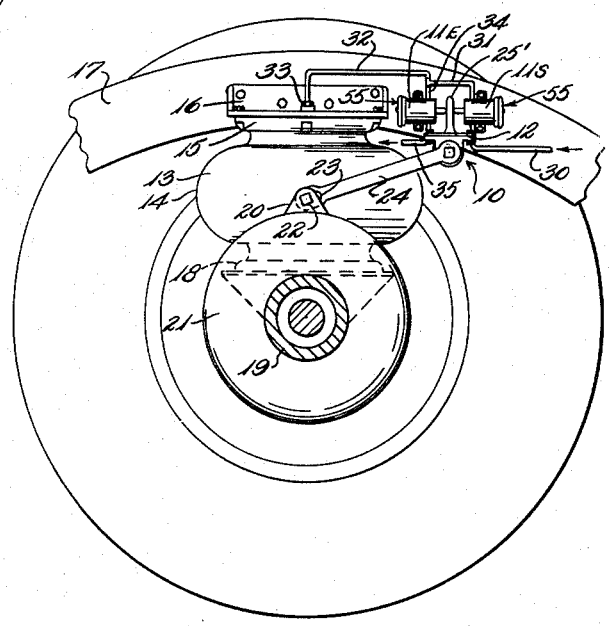
Fig. 1 is a vertical sectional view through a vehicle axle showing in elevation a portion of the vehicle equipped with a pneumatic suspension system according to the invention.

In the prseent invention, a control device, indicated in its entirety by the numeral 10, includes opposed coaxial valve housings 11E and 11S, and a base 12. The control device is located remotely and laterally of a conventional air spring bellows 13, of mutli-ply rubber and core construction and having one or more convolutions 14. The upper end of the air spring is hermetically fastened by a suitable clamp ring 15 to the underside of a horizontal transverse member 16 constituting a portion of the vehicle frame. The member 16 is securely affixed at either end to longitudinal frame members 17. The lower end of the air spring 13 is also hermetically fastened by a similar clamp ring 18 to the axle housing 19 of the vehicle road gear. One mode of interposing an air spring between a vehicle frame and road gear has been shown and described. It will be understood, however, that the principles of the invention are applicable to air springs interposed in other ways between the frame and road gear. Also, only one air spring has been shown in connection with this invention, but it will be understood that the invention may be utilized with as many air springs as are required on a vehicle.

A stub flange 20, which may be located atop the vehicle differential housing 21, has a bolt 22 therethrough, which bolt extends through an elongated longitudinal slot 23 formed in the lower end of a control valve actuating rod 24, so that rod 24 is slidably mounted on bolt 22. The upper end of the actuating rod is fixed to one end of an oscillatable control valve actuating member 25.

The opposed coaxial housings 11E and 11S are preferably located above and to the front of the horizontal plane of the axle and are fastened by bolts 27, extending through suitable mounting flanges 28, to one of the longitudinal frame members 17. The plate 12 is secured, preferably by welding, to the same member 17, beneath the housings 11.

Air, from a storage source under pressure (not shown), is supplied to the air supply housing 11S of the control device 10 by suitable piping 30 below the base 12 and having a check valve (not shown) therein, so that air cannot back out. After passage through the housing 11S, as described below, the air passes through the piping 31 atop the housing, which is in communication with bellows piping 32, to an air spring fitting 33 which extends through the frame member 16 into the air spring 13. Thus, the piping 30, housing 11S, piping 31, piping 32 and fitting 33 define the conduit by which air under pressure is supplied to the air spring 13.

Exhaust air from the air spring 13 passes through th piping 32 into a short length of piping 34, atop the air exhaust housing 11E, through the housing 11E as described below, and vents to the atmosphere through the piping 35, below the base 12. Thus, the fitting 33, piping 32, piping 34, housing 11E and piping 35 define the conduit by which air is exhausted from within the air spring 13.

Figure 2:
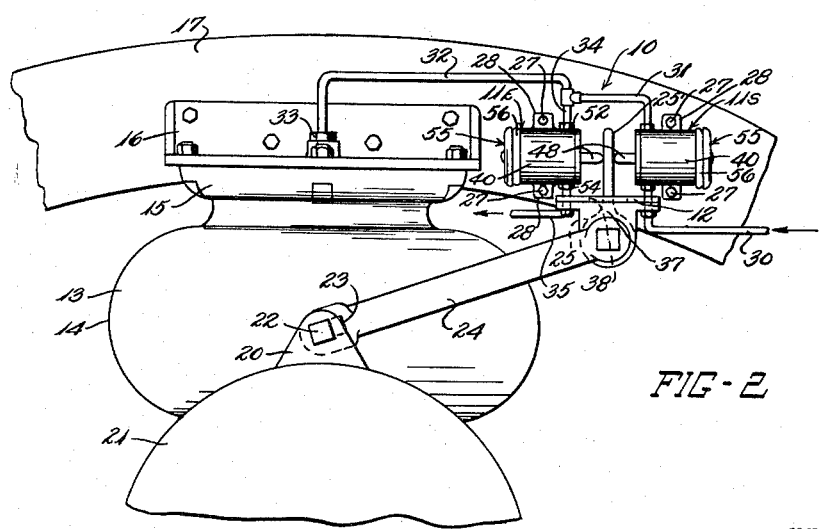
Fig. 2 is an enlarged fragmentary view, similar to Fig. 1, of the valve and control means.
Figure 3:
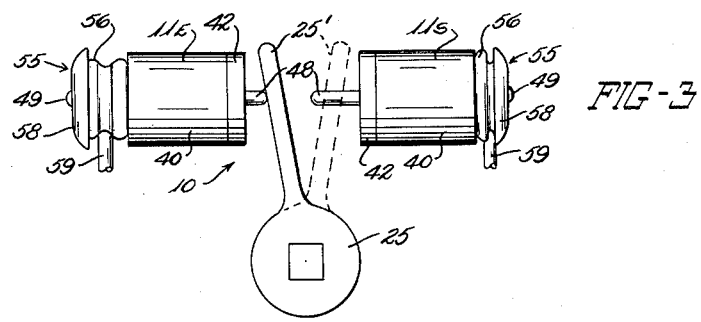
Fig. 3 is a fragmentary view showing a portion of the valve and control means in an air supply or operative position.

Referring to Fig. 2, the actuating member 25 extends longitudinally of the base plate 12 and is journaled, so as to oscillate between the housings 11E and 11S, in a bracket 37 affixed to the underside of the base plate. Extending upwardly through a longitudinal slot 38 in the base plate is an actuating lever 25' which, in response to the movement of member 25 as caused by the actuating rod 24, selectively actuates the valves within housings 11E or 11S.

Figure 5:
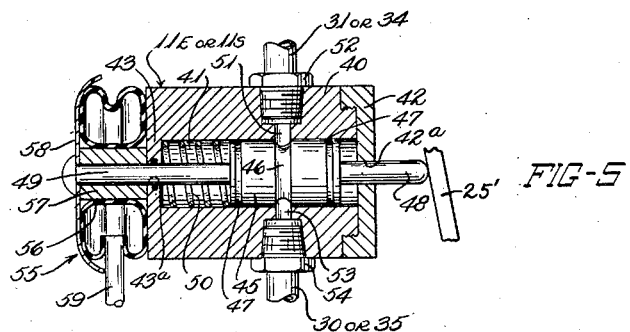
Fig. 5 is an enlarged sectional view of a control device valve housing, showing the valve and control means in an operative condition.

Referring to Fig. 5, the opposed coaxial housings 11E and 11S are substantially identical so that only one need be described, the same reference numerals applying equally to both. A housing, 11E or 11S, has a generally cylindrical body portion 40. Extending axially of the body portion is a large diameter bore 41. The bore is closed at one end by a threaded cap 42 having a small diameter bore 42a in concentric alignment with the bore 41. The end wall 43 of the body portion 40, opposite of the cap 42, has a similar bore 43a. Fitted within the bore 41, and slidable therein, is a plunger 45. The plunger has a medial circumferential channel or groove 46 and is fitted at either end with peripheral O-rings 47 to provide a fluid tight seat. Extending longitudinally from the plunger 45 and outwardly through bore 42a in the cap is a plunger actuating rod 48. Extending longitudinally from the other end of the plunger and outwardly through bore 43a in the end wall 43 of the body 40 is a plunger locking rod 49. A coiled spring 50 is seated within bore 41, surrounding rod 49 and normally biases the plunger 45 to a position in abutting contact with the inside of the end cap 42.

Within the body 40, and communicating with the groove 46 around the plunger 45, is a short vertical bore 51, into the upper end of which is inserted a fitting 52. In housing 11S, the fitting 52 is connected with the supply piping 31. In housing 11E, the fitting 52 is connected with the exhaust piping 34. On the underside of the body 40, opposite of the bore 51, is a similar bore 53 into the lower end of which is inserted a fitting 54. In housing 11S, the fitting 54 is connected with the supply piping 30. In housing 11E, the fitting 54 is connected with the exhaust piping 35.

The locking means to prevent operation of the device 10 when the vehicle is in motion is indicated generally by the numeral 55. The locking means 55 is preferably in the form of an inflatable, resilient ring 56 fitted around a core plug 57. The plug 57 is secured to the rod 49 between an end plate 58 and the end wall 43 of the body 40. Suitable piping 59 connects the inflatable ring 56 to a source of fluid under pressure (air or hydraulic, not shown) which causes the ring to become inflated, when the vehicle is in motion. As described below, inflation of the ring 56 causes the plunger 45 to move transversely of bores 51 and 53 (to the left, as viewed in Fig. 5), thus preventing any flow of air through the fittings 52 and 54.

It will be apparent that the locking means 55 may also be a suitable electrical means, such as a solenoid, which will function to render the control device inoperative, as described below, when the vehicle is in motion.

Figure 4:
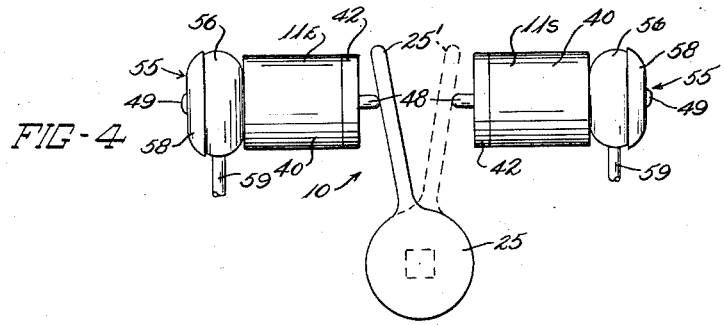
Fig. 4 is a view, similar to Fig. 3, showing the valve and control means in an inoperative condition, as when the vehicle is in motion.

The operation of the control device 10 is as follows:

When the vehicle is in motion, fluid under pressure is supplied, through the piping 59 to the rings 56, which are thus inflated, moving the plungers 45 to an inoperative position and retracting the actuating rods 48 inwardly of the housings 11E and 11S (Fig. 4) a distance sufficient so that the maximum movement of the member 25 and lever 25' will not actuate the valves.

Now then, assume that the vehicle comes to rest and assume, also, that the static load is increased, for example, by adding merchandise or passengers to the vehicle. When the vehicle comes to rest, fluid is no longer supplied to the rings 56 through piping 59 and the plungers 45 are urged by the springs 50 toward the end caps 42, which is also an inoperative position. As the load is increased the upper frame members 15 and 16 move downwardly toward the axle housing 19, causing the air spring 13 to contract. During this downward movement of the frame members, the control device 10 also moves downwardly causing the actuating member 25 to be turned by the actuating rod 24, the lower end of which is slidably attached to the differential housing, to permit sliding movement of the rod as the device moves downwardly.

As viewed in Fig. 1, an increased load would cause the member 25 and lever 25' to oscillate in a clockwise direction toward housing 11S. As the lever 25' is oscillated clockwise, the plunger rod 48, which has been urged outwardly of the port body 40 by the spring 50, will be displaced inwardly causing the groove 46 in the plunger 45 to become in communication with the bores 51 and 53 (Fig. 5). Thus, the plunger 45 is now in an operative position and additional air is free to pass through the piping 30, fitting 54, bore 53, groove 46, bore 51, fitting 52, piping 31, piping 32 and fitting 33, into the air spring 12. This additional air must be under a greater pressure than the air already in the air spring 13, and will extend the air spring to its initial position.

As the air spring extends, the upper frame members 15 and 16 move upwardly from the axle housing causing member 25 to be oscillated in a counter-clockwise direction as viewed in Fig. 1. As the lever 25' begins to assume the normal position (Fig. 1), the spring 50 will urge the plunger 45 toward the inoperative position adjacent the end cap 42 and the groove 46 will no longer be in communication with the bores 51 and 53 and the flow of air will cease.

If the static load on the vehicle suspension is decreased, the frame members 15 and 16 move upwardly away from the axle housing 19, causing the air spring 13 to extend. During this upward movement of the frame members, the control device 10 also moves upwardly, causing member 25 to be turned by rod 24, in a counter-clockwise direction as viewed in Fig. 1, said rod sliding with respect to the bolt 23 as the device 10 moves upwardly.

As the member 25 is oscillated counter-clockwise on its axis, the plunger rod 48 within housing 11E will be moved inwardly (Fig. 4), moving the plunger 45 to an operative position and causing air to be exhausted from the air spring 12, through fitting 33, piping 32, piping 34, fitting 52, bore 51, groove 46, bore 53, fitting 54 and piping 35, to the atmosphere. This exhaust of air will restore the air spring 12 to its initial position.

A shut off valve (not shown) can be provided in the air spring line 34 so that an operator can shut off the line when raising the vehicle by a bumper jack to remove a tire.

While a preferred embodiment of the invention has been shown and described, it will be understood that changes and modifications may be made therein without departing from the spirit of the invention or the scope of the subjoined claim.

What is claimed is:

Control means for regulation of the supply and exhaust of air to and from the expansible bellows for a vehicle suspension system to maintain a predetermined height between the road gear and frame of the vehicle, comprising, a member adapted to be journaled on said frame and adapted for rotation by relative movement between the road gear and frame of the vehicle, an oscillative lever carried by and extending generally upwardly from said member, two housings adapted to be coaxially secured to said frame with one each on opposite sides of said lever, each housing having walls defining a longitudinal bore with closed ends and two aligned conduits extending radially of said bore through a housing wall, an air-tight plunger slidable in each housing bore having a circumferential groove for simultaneous registration with said conduits, said conduits adapted to communicate with said bellows when in registry with said groove, an actuating rod secured to adjacent ends of each of said plungers and projecting through a bore end of each housing toward said lever and a locking rod secured to the opposite ends of each plunger and projecting through the opposite bore end of each housing, and an inflatable ring surrounding each rod longitudinally of the housing for maintaining said plunger groove in unregistered relation with said conduits.

References Cited in the file of this patent

UNITED STATES PATENTS

| | | |
|---|---|---|
| 1,211,040 | Baird et al. | Jan. 2, 1917 |
| 1,371,648 | Schmidt | Mar. 15, 1921 |
| 1,432,103 | Feller | Oct. 17, 1922 |
| 2,329,450 | Beacroft | Sept. 14, 1943 |
| 2,579,084 | Krotz et al. | Dec. 18, 1951 |
| 2,635,639 | Eggenberger | Apr. 21, 1953 |
| 2,670,201 | Rossman | Feb. 23, 1954 |
| 2,687,311 | Nallinger | Aug. 24, 1954 |
| 2,774,377 | MacDuff | Dec. 18, 1956 |
| 2,787,475 | Jackson | Apr. 2, 1957 |